US008634126B2

(12) United States Patent
George et al.

(10) Patent No.: US 8,634,126 B2
(45) Date of Patent: *Jan. 21, 2014

(54) DIGITAL BINARY MEMS WAVEFRONT CONTROL

(71) Applicant: University of Rochester, Rochester, NY (US)

(72) Inventors: Nicholas George, Pittsfore, NY (US); Kedar Khare, New Delhi (IN)

(73) Assignee: University of Rochester, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/662,928

(22) Filed: Oct. 29, 2012

(65) Prior Publication Data

US 2013/0063804 A1  Mar. 14, 2013

Related U.S. Application Data

(63) Continuation of application No. 12/304,025, filed as application No. PCT/US2006/025254 on Jun. 28, 2006, now Pat. No. 8,107,156.

(51) Int. Cl.
 *G02B 26/00* (2006.01)

(52) U.S. Cl.
 USPC .......................................... 359/290; 359/291

(58) Field of Classification Search
 USPC .................................................. 359/290, 291
 See application file for complete search history.

(56) References Cited

U.S. PATENT DOCUMENTS

2005/0088738 A1* 4/2005 Islam et al. .................... 359/484

* cited by examiner

*Primary Examiner* — James Jones
(74) *Attorney, Agent, or Firm* — William Greener; Bond, Schoeneck & King, PLLC (57) ABSTRACT

Embodiments of the invention are directed to a new type of phase screen, i.e., an opto-electronic device that can convert a distorted incoming optical wavefront into a plane wave or, conversely, transform a plane wave into a prescribed varying output wavefront. The basic concept involves novel binary all-digital MEMS interferometer configurations that can be used to create controlled and arbitrary optical wavefront using only 0,1 amplitude changes followed by differential propagation distances to convert these amplitude variations into controllable and/or continuous phase variations. Clustered pixel notions, such as Floyd-Steinberg, Stucki or other algorithms useful in digital half-tone printing, are simultaneously employed to create controllable grey-level variations as well as continuous phase variations. Desired grey-levels can be obtained wherein each pixel is formed by, e.g., a 3×3 or 5×5 cluster of mirrors. Both the filling-in of the outputs of the binary mirror (0,1) and the grey-levels are accomplished simply by spatial averaging over a short propagation distance.

4 Claims, 10 Drawing Sheets

DIGITAL BINARY MEMS WAVEFRONT CONTROL

RELATED APPLICATIONS

This application is a continuation of, and claims the full line of priority to U.S. application Ser. No. 12/304,025 filed on Dec. 9, 2008, which itself is a US national stage filing of PCT/US2006/025254 filed on 28 Jun. 2006, the subject matter of which are incorporated herein by reference in their entireties.

FEDERALLY SPONSORED RESEARCH

This invention was made with U.S. Government Support under Contract Number DAAD 19-03-1-0185 (44430-PH), awarded by the US Army Research Office. The Federal Government has certain rights in the invention.

BACKGROUND OF THE INVENTION

1. Field of the Invention

Embodiments of the invention are most generally related to the field of optical modulation and opto-electronic imaging. More particularly, embodiments of the invention are directed to novel apparatus and methods that effect phase and absolute value of the amplitude, hereinafter amplitude, control over an optical wavefront, and to applications directed to atmospheric sensing, optical metrology, astronomical and ophthalmic imaging, adaptive optics and interferometry.

2. Description of Related Art

In optical interferometry one often needs to generate a particular function form for the variation of amplitude over a given transverse plane starting, for example, from a uniform plane wave. As a specific instance in optical metrology, one generates the family of Zernike polynomials using modern optical interferometers with special masks incorporated. These specified wavefronts are used to test the accuracy of a particular optical surface being fabricated. In addition there are other instances when a distorted wavefront needs to be corrected so as to provide a plane wave output or a converging wave of specific radius of curvature for the equiphase of the propagating wave. For instance, when an optical signal travels from point A to point B, the quality of the received signal is less than that of the transmitted signal. This degradation is due to variation in the uniformity of the medium (index of refraction) that the light propagates through in going from point A to point B. Common examples include the light from a star that is distorted by atmospheric turbulence; poor vision due to defects in the optics of the eye; and, noisy communication caused by a non-uniform index of refraction over the signal path.

Viewed simply, a point source of light such as a star, for example, radiates spherical wavefronts of light in all directions. A wavefront is the locus of points having the same phase i.e., have the same path length from the source. To a distant viewer on earth, the wavefront of the light traveling along the viewer's line of sight is in the form of a flat, uniform plane of light; i.e., a plane wavefront. However, when the index of refraction of the propagation medium changes, the path lengths are no longer equal or normal to the propagating plane wavefront. Instead, the wavefront is distorted or aberrated. Thus the phase of the wavefront is no longer uniform over the spatial extent of the wavefront.

Wavefront sensors are now commonly used to measure higher-order aberrations of a wavefront propagated through an optical system. A Shack-Hartmann sensor is often the principal component of modern ophthalmic wavefront measuring devices. Several other types of wavefront sensors are also commercially popular. Once a distorted wavefront is measured and quantified, it may be desirable to compensate the wavefront; i.e., to bring it back to its non-aberrated state. Deformable mirrors, referred to as adaptive or active optics (AO) depending upon their application, are well known in the art. An adaptive optics imaging system, for example, is designed to correct for phase distortions in the optical wavefront in near real time to obtain improved image quality. Adaptive optical imaging originated as a tool for improving the performance of ground-based large telescopes for astronomical imaging through atmospheric turbulence. Another application is the correction of atmospheric turbulence over horizontal propagation paths. Adaptive imaging techniques have also been applied to wavefront control of large astronomical telescopes by using high power lasers and guide stars to generate perturbed wavefronts for correction of the astronomical image. Adaptive optics and wavefront control are also commonly used in laser fusion to correct for minute phase perturbations as the laser beam propagates through various lenses of the system. The typical components used in a present day adaptive system are listed in Table 1.

TABLE 1

| Wavefront Sensors | Wavefront Correctors |
| --- | --- |
| Shack-Hartmann Sensor | Continuous membrane mirrors with PZT |
| Curvature sensor | Segmented mirrors with PZT |
| Shearing interferometer | Bimorph Mirrors |
| Smartt interferometer | MEM micro-mirrors |
| Pyramid sensor | Liquid Crystal SLMs |

Conventional designs for wavefront correctors include segmented mirror devices with each mirror segment having tip/tilt and piston controls, and continuous membrane (analog) devices with a number of actuators on their back side for deforming the mirror surface. Bimorph mirror technology uses two piezoelectric wafers bonded together with an array of electrodes. The outer surface of one of the mirror acts as a mirror. These devices are most suitably used with a curvature sensor configuration. More recent technologies used for phase screens, as they are sometimes called, include liquid crystal spatial light modulators (SLMs) and analog-type MEMS based micro-mirrors. Spatial light modulation is used, for example, in the fields of optical information processing, projection displays, video and graphics monitors, televisions, astronomy and electrophotographic printing. There, optical beams are deflected by mirror arrays where it is desired to be able to individually phase adjust the reflected light from each mirror. Often, the phase screen in an AO telescope is the single most troublesome component in the system. Typically, the phase screen is an LCD used in transmission mode with a voltage applied in an x-y coordinate system, pixel by pixel. It can also take the form of multiple PZT actuators used to push or deform a smooth mirror membrane into an aberration compensating surface shape.

Cost is an important factor in choosing an appropriate deformable mirror technology for a given application. Piezo-activated (PZT) deformable mirrors can cost over $1000 per actuator, thus a large mirror array can be extremely expensive. MEMS devices are typically manufactured using fabrication methods developed in the semiconductor industry. Comparatively, MEMS technology offers a low-cost attractive alternative. There are generally two types of micro-mirror arrays: (1) Devices with piston and tip/tilt controls for micro-mirrors; and (2) simple ON/OFF type binary micro-mirror arrays. The state-of-the-art devices of the first type have ~1000 micromirrors each about 300 microns on a side, and each having an ~2 micron piston stroke motion and ~7 kHz frame rate. The ON/OFF type (i.e., digital binary MEMS) devices on the other hand have close to a million mirror elements, each being ~17 micron on a side. Digital binary MEMS mirror technology has been developed over the last two decades. Arrays consisting of ~$10^6$ mirrors that impart binary (1,0) amplitude modulation to the incident wavefront at ~10 kHz frame rates are now available commercially at low cost. They have found widespread application, for example, in projection display systems. In recent years other applications of these arrays have evolved, e.g. in generation of (1,0) mask patterns in lithography, for implementing a moving aperture in a confocal microscope, for obtaining multiplexing Hadamard type mask patterns in spectroscopy applications, etc. The ability to provide only (1,0) type amplitude modulation has thus far been treated as a limitation that has prevented their use in adaptive systems for phase correction. A new way of wavefront phase coding is required that will permit the use of binary mirror arrays for wavefront phase modulation.

It is possible to generate selected wavefronts using deformable MEMS mirrors or LCD spatial light modulators. There are, however, certain disadvantages associated with their use. These devices typically cannot work over a broad range of wavelengths from the visible to long wavelength infra-red. As mentioned above, the cost for a 1000×1000 actuator assembly is prohibitive. MEMS devices currently used in adaptive optics setups do not offer as high resolution as may be desired for a particular application. The control of a large mirror array is complex and a large MEMS array can be susceptible to backlash errors. Half-toned characterization of phase front, as will be described below and used in conjunction with embodiments of the instant invention, would require high computational loading using the aforementioned deformable mirror devices.

In view of the challenges and disadvantages associated with wavefront phase control using deformable mirrors and/or LCD SLMs, the inventors have recognized that significant benefits may be realized by the various embodiments and aspects of the invention described in detail below and as defined in the appended claims. As mentioned above, a new way of wavefront phase coding is required that will permit the use of digital binary mirror arrays for wavefront phase modulation. The ability to generate an arbitrary wavefront using only binary (ON/OFF) micro-mirror arrays combined with digital half-toning methods and differential propagation distances has several advantages over deformable analog MEMS mirrors or LC spatial light modulators. The benefits and advantages include, but are not limited to, the ability to generate arbitrary wavefronts using only binary (ON/OFF) micro-mirror arrays combined with digital half-toning methods; broadband performance over the wavelength range from the visible to LWIR; an effective frame size of ~200×200 to 300×300 pixels using digital half-toning algorithms over, e.g., 3×3 or 5×5 mirror blocks at a fraction of the cost for comparable MEMS performance; resolution that far exceeds analog MEMS device capability; simpler operation; less susceptibility to backlash errors; lower computational load, easy system calibration; all digital architecture; environmental robustness and stability, and others that will be recognized by persons skilled in the art.

As used herein, the term 'analog' refers to a continuous membrane mirror surface that may be deformed by a number of actuators coupled to the rear surface of the membrane, or, to a MEMS device where the individual mirrors can be stepped over multiple positions instead of simple binary 0,1.

In contrast, a 'digital' binary MEMS mirror, as that term will be used in conjunction with various embodiments and aspects of the invention described herein, will refer to a MEMS mirror array in which each individual mirror segment can only be in an "ON" position (referred herein below as having a 1 value and oriented to retro-reflect incident light) or an "OFF" position (referred to herein below as having a 0 value and tilt-oriented to reflect incident light away from the intended optical path).

Figure 1:
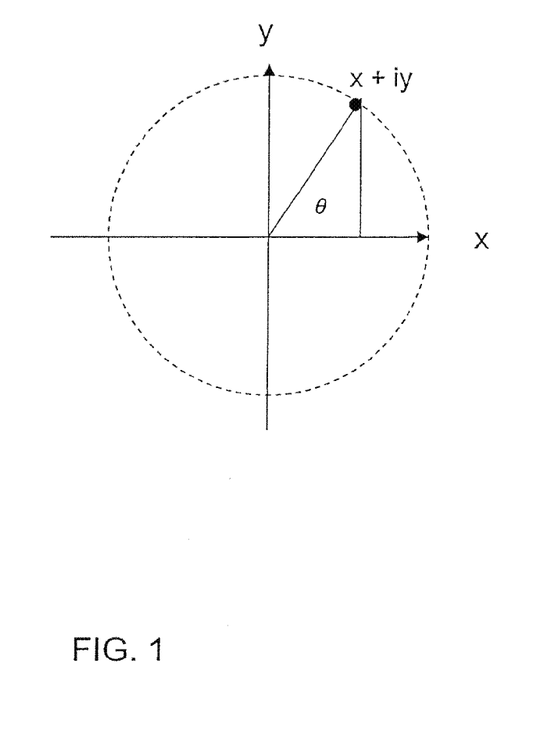
FIG. 1 shows a general Argand diagram, which is used to illustrate the geometric representation of a complex number as simply a point in the complex plane, provided as an aid in understanding the invention.

FIG. 1 shows what is known as an Argand diagram, which is used to illustrate the geometric representation of a complex number as simply a point in the complex plane. An Argand diagram is a plot of complex numbers as points z=x+iy in the complex plane using the x-axis as the real axis and the y-axis as the imaginary axis, where z=(abs)z $e^{i\theta}$. In the figure, the radius of dashed circle represents the complex modulus (abs)z of z and the angle θ represents its complex argument or what can be called the phase. The phase, θ, corresponds to the counterclockwise angle from the positive real axis, i.e., the value of θ such that x=(abs)z (cos θ) and y=(abs)z (sin θ). Since a wavefront may be described by Euler's equation $e^{i\ \theta(x,y)}$=cos θ+i sin θ, in conjunction with various embodiments of the invention described herein below, the notation of the Argand diagram may be useful to the reader in illustrating various aspects of the invention.

The advantages and benefits provided by the teachings disclosed herein and the embodiments of the invention disclosed and claimed will become more apparent to persons skilled in the art in view of the following description and drawings.

SUMMARY OF THE INVENTION

Most generally, embodiments of the invention are directed to a new type of phase screen, i.e., an opto-electronic device that can convert a distorted incoming optical wavefront into a plane wave or, conversely, transform a plane wave into a prescribed varying output wavefront. The basic concept involves novel binary all-digital MEMS configurations that can be used to create an arbitrary optical wavefront using only 0,1 amplitude changes followed by differential propagation distances to convert these amplitude variations into controllable and/or continuous phase variations. As used herein, the term 'arbitrary' wavefront refers to a pixel phase value that can be represented anywhere in the complex plane described by an associated Argand diagram, rather than just on the unit value circle boundary or on some other restricted portion of the complex plane. Clustered pixel notions, such as Floyd-Steinberg, Stucki or other algorithms useful in digital half-tone printing, are simultaneously employed to create controllable grey-level variations as well as continuous phase variations. Desired grey-levels can be obtained wherein each pixel is formed by a cluster of 3×3 mirrors or 5×5 mirrors, for example. Both the filling-in of the outputs of the binary mirror (0,1) and the grey-levels are accomplished simply by short propagation.

According to an embodiment of the invention, an optical control component includes a first component beam divider/combiner disposed along a first component input optical path of an incident optical wavefront; a first component binary MEMS device $M1_1$ comprising an $(n_{x,y} \times m_{x,y})_{M1}$ mirror array disposed optically downstream of the first component beam divider/combiner along an M1 optical path having a total optical path length $L1_1$ (i.e., L1 is a double-pass distance); a first component binary MEMS device $M2_1$ comprising an $(n_{x,y} \times m_{x,y})_{M2}$ mirror array disposed optically downstream of the first component beam divider/combiner along an $M2_1$ optical path different than the $M1_1$ optical path having a total optical path length $L2_1$; and phase retarder means for making $L1_1$ different than $L2_1$, wherein at least an $M1_1$ mirror sub array $(X \times Y)_{M1}$ is in an ON/OFF state and a complementary at least an $M2_1$ mirror sub array $(X \times Y)_{M2}$ is in an OFF/ON state, further wherein an output wavefront propagating along a first component output optical path has a controlled modulation.

Another embodiment of the invention is directed to an optical control device comprising a first optical control component as described immediately above; a second optical control component including a second component beam divider/combiner disposed along a second component input optical path of an input optical wavefront; a second component binary MEMS device $M1_2$ comprising an $(n_{x,y}, m_{x,y})_{M1}$ mirror array disposed optically downstream of the second beam divider/combiner component along an $M1_2$ optical path having a total optical path length $L1_2$; a second component binary MEMS device $M2_2$ comprising an $(n_{x,y}, m_{x,y})_{M2}$ mirror array disposed optically downstream of the second beam divider/combiner component along an $M2_2$ optical path different than the $M1_2$ optical path having a total optical path length $L2_2$; and phase retarder means for making $L1_2$ different than $L2_2$, wherein at least an $M1_2$ mirror sub array $(X \times Y)_{M1}$ is in an ON/OFF state and a complementary at least an $M2_2$ mirror sub array $(X \times Y)_{M2}$ is in an OFF/ON state, further wherein an output wavefront propagating along a second component output optical wavefront path has a controlled modulation; an input beam divider disposed optically intermediate an incoming wavefront and the first and second optical control components, wherein the output optical wavefront from the input beam divider is the input optical wavefront to the first and second optical control components; an output beam combiner disposed to optically combine the respective first and second component modulated output wavefronts; and phase shifting means for providing a controlled phase difference between the first and second component phase modulated output wavefronts, wherein a resultant output wavefront has a phase that is different than the input optical wavefront phase by an amount $\theta(x,y)$.

An alternative embodiment of the invention is directed to an optical control device that uses a two-level half-toning algorithm to generate a controlled wavefront. The device comprises a diffractive, input wavefront divider/combiner (G) disposed along an optical axis of the input wavefront; a first component diffractive wavefront divider/combiner (G1) disposed to optically intercept one of a positive and a negative $n^{th}$-order output beam from the input wavefront divider/combiner; a first component binary MEMS device M1 comprising an $(n_{x,y}, m_{x,y})_{M1}$ mirror array disposed optically downstream of the first beam divider/combiner component along an M1 optical path, wherein at least an M1 mirror sub array $(X \times Y)_{M1}$ is in a selected ON/OFF state that provides a half-tone phase value H, where $0 \leq H \leq 1$; a second component diffractive wavefront divider/combiner (G2) disposed to optically intercept either a complementary negative or positive $n^{th}$-order output beam from the input wavefront divider/combiner; a second component binary MEMS device M2 comprising an $(n_{x,y}, m_{x,y})_{M2}$ mirror array disposed optically downstream of the second beam divider/combiner component along an M2 optical path, wherein a complementary M2 mirror sub array $(X \times Y)_{M2}$ is in a selected complementary OFF/ON state that provides a half-tone phase value $(1-H)$, where $0 \leq (1-H) \leq 1$; and at least one optical component that in-couples the input wavefront and out-couples an output wavefront having a controlled phase that is different than the input wavefront phase. According to an aspect, the diffractive wavefront divider/combiner, the first component diffractive wavefront divider/combiner and the second component diffractive wavefront divider/combiner are diffraction gratings each having a grating period $\Lambda$.

Another embodiment of the invention is directed to an optical control device comprising a polarizing beam divider/combiner disposed along a component input optical path of an incident optical wavefront, providing one polarization state $P1_1$ and another polarization state $P2_1$; a quarter wave plate which on two passes will cause the exiting P1 to rotate by 90 degrees so as to pass through the polarizer beam divider/combiner; a first binary MEMS device $M1_1$ comprising an $(n_{x,y}, m_{x,y})_{M1}$ mirror array disposed optically downstream of the polarizing beam divider/combiner along an $M1_1$ optical path of P1, wherein at least an M1 mirror sub array $(X \times Y)_{M1}$ is in a selected ON/OFF state that provides a half-tone phase value $(1-H)$, where $0 \leq (1-H) \leq 1$; a second quarter wave plate; and a second binary MEMS device M2 comprising an $(n_{x,y}, m_{x,y})_{M2}$ mirror array disposed optically downstream of the polarizing beam divider/combiner along an M2 optical path of P2, wherein an M2 mirror sub array $(X \times Y)_{M2}$ is in a selected complementary OFF/ON state that provides a half-tone phase value H, where $0 \leq H \leq 1$, further wherein an output wavefront propagating along an output optical wavefront path has a polarization coded phase profile over a transverse cross section of the output wavefront.

According to a related embodiment, a grating-based interferometer device uses a novel three-level half-toning algorithm to generate an arbitrary wavefront having controlled amplitude and phase. In this embodiment, a third MEMS component is disposed so as to intercept the zero-order diffracted beam. The wavefront can be expressed as the sum of polynomials in $H(x,y)$ having appropriate phase. When relative phase delays are introduced between each of the three beams, they can be combined to produce an arbitrary wavefront having an absolute amplitude and phase expressed as $a(x,y) \exp[i\theta(x,y)]$.

Another embodiment of the invention is directed to an optical control device, comprising a beam divider/combiner disposed along an input optical path of an incident optical wavefront; a first binary MEMS device M1 comprising an $(n_{x,y}, m_{x,y})_{M1}$ mirror array disposed optically downstream of the first component beam divider/combiner along an M1 optical path providing an $M1_{out}$ wavefront, wherein at least an M1 mirror sub array $(X \times Y)_{M1}$ is in an ON/OFF state that provides a half-tone phase value expressed as $1-H(x,y)$, wherein $H(x,y)$ represents a two-level value equal to 0 or 1; a second binary MEMS device M2 comprising an $(n_{x,y}, m_{x,y})_{M2}$ mirror array disposed optically downstream of the beam divider/combiner along an M2 optical path providing an $M2_{out}$ wavefront, wherein a complementary M2 mirror sub array $(X \times Y)_{M2}$ is in an OFF/ON state that provides a half-tone phase value expressed as $H(x,y)$; and phase retarder means for providing a controlled phase difference between the $M1_{out}$ wavefront and the $M2_{out}$ wavefront, further wherein a resultant output wavefront obtained from the interference of the $M1_{out}$ wavefront and the $M2_{out}$ wavefront is different than the input optical wavefront by an amount $\alpha H(x,y)$ where $-\pi \leq \alpha \leq \pi$. According to an aspect, the device effects a wavefront coding on the input wavefront expressed as $e^{i\alpha H(x,y)} = (1-H) + e^{i\alpha}H$, wherein $1-H(x,y)$ is the half-tone phase coding provided by the ON/OFF state of M1, H is the half-tone phase coding provided by the OFF/ON state of M2, and $e^{i\alpha}$ represents the relative phase term between $M1_{out}$ and $M2_{out}$.

According to an aspect of the above described embodiments, a telecentric telescope may be disposed in the output wavefront plane to shift the output plane further downstream.

The size of the telescope aperture can be used to control the size (X×Y) of the mirror sub-array over which the spatial averaging is performed in order to realize the half-toning effects.

Another embodiment of the invention is directed to a method for controlling an optical wavefront WF, comprising the steps of providing a first controllable binary MEMS device M1 comprising an $(n_{x,y}, m_{x,y})_{M1}$ mirror array, wherein each mirror can be set only to a binary ON/OFF position, and a second controllable binary MEMS device $M2_1$ comprising an $(n_{x,y}, m_{x,y})_{M2}$ mirror array, wherein each mirror can be set only to a binary ON/OFF position; providing an incident optical wavefront $WF_{1i}$; splitting the incident optical wavefront into $WF1_1$ along a first optical path $L1_1$ to $M1_1$ and into $WF2_1$ along a second optical path $L2_1$ to $M2_1$; modulating $WF1_1$ reflected from $M1_1$ by setting at least one M1 mirror sub array $(X_{x,y} \times Y_{x,y})_{M1}$<array $(n_{x,y} \times m_{x,y})_{M1}$ to an ON position and modulating $WF2_1$ reflected from $M2_1$ by setting a complementary at least one mirror sub array $(X_{x,y} \times Y_{x,y})_{M2}$<array $(n_{x,y} \times m_{x,y})_{M2}$ to an OFF position; providing an optical path length difference $\Delta L1L2$ in a range $0<\Delta L1L2 \le (2n+1)\lambda/2$, where n=0, 1, 3, . . . , so as to provide a phase shift≤π; and obtaining a desired output optical wavefront $WF_{1o}$ by optically combining reflected $WF1_1$ and reflected $WF2_1$. According to an aspect, modulating a phase profile of the wavefront by setting the at least one mirror sub array $(X_{x,y} \times Y_{x,y})$ to a selected ON/OFF position comprises providing an averaged grey-scale pixel value over the sub array. An aspect further includes employing a half-toning algorithm, wherein a single grey-scale pixel is represented by a spatially averaged dot pattern over the X×Y mirror sub array. As will be appreciated, the mirror sub array is equivalent to a mirror cluster that is used to define a pixel, as is known in the field of digital imaging.

In various aspects of the above mentioned embodiments, the at least some of the mirror array is one or more cluster arrays X×Y (<n×m), wherein each mirror cluster array X×Y represents a pixel and is characterized by at least a two-level phase half-toning approximation. In particular aspects, X=Y and n=m.

These and other objects, advantages and benefits provided by embodiments of the invention will now be set forth in detail with reference to the detailed description and the drawing figures and as defined in the appended claims.

BRIEF DESCRIPTION OF THE DRAWINGS

FIGS. 3a, 3b and 3c show alternating dark/bright bar patterns illustrating half-toning in conjunction with the component in FIG. 2b. FIG. 3b shows a hard-thresholding version of FIG. 3a.

FIG. 4b schematically illustrates a pixel point P(x,y) in an exemplary 5×5 mirror sub array of the MEMS device of FIG. 4a;

FIG. 4c shows an Argand diagram representation of point P(x,y) of FIG. 4b;

FIGS. 6a-6c show alternating dark/bright ring patterns illustrating half-toning in conjunction with the device in FIG. 5. FIG. 6b shows a hard-thresholding version of FIG. 6a.

DETAILED DESCRIPTION OF A PREFERRED EMBODIMENT OF THE INVENTION

As used herein, the term 'digital binary MEMS' refers to a micro-electromechanical mirror array system that is subject only to binary (i.e., ON/OFF or 1,0) control by tilting each mirror facet to a retro-reflecting (1) position for incident light (ON position) or to an off-axis (0; tilted or OFF) reflecting position for the incident light.

The term 'amplitude' as used herein will be recognized by those skilled in the art as referring to a complex number with a real part and an imaginary part or, equivalently, with an absolute value amplitude and a phase angle, as is a well-known signal representation in the solutions of Maxwell's equations in a harmonic time-dependent formalism.

According to a first illustrative embodiment and with reference to FIGS. 2a-2c and 3a-3c, we disclose a novel approach to wavefront generation using binary amplitude modulation of an input plane wave. The basic problem of wavefront generation is to achieve a wavefront described by $\exp[i\theta(x,y)]$, when the function $\theta(x,y)$ is specified. Using the relation $$\exp[i\theta(x,y)] = \cos[\theta(x,y)] + e^{i\pi/2} \sin[\theta(x,y)], \quad (1)$$

we require a way to represent $\cos[\theta(x,y)]$ and $\sin[\theta(x,y)]$, which can then be added interferometrically with the appropriate relative phase term of $e^{i\pi/2}$ to generate the desired wavefront. The cosine and sine can take values in the range of [−1, 1].

Figure 2A:
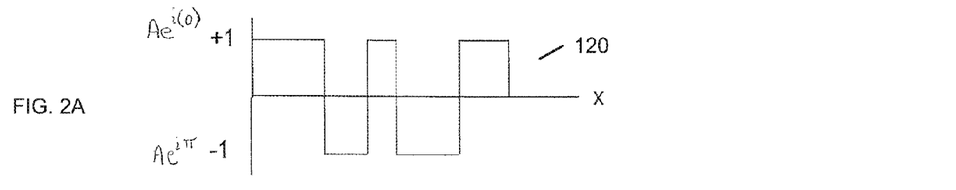
FIGS. 2a, 2b and 2c, respectively, illustrate a square wave pattern used to modulate an input wavefront; an optical control component according to an embodiment of the invention; and an Argand diagram representation of the interferometric output from the optical control component.
Figure 2B:
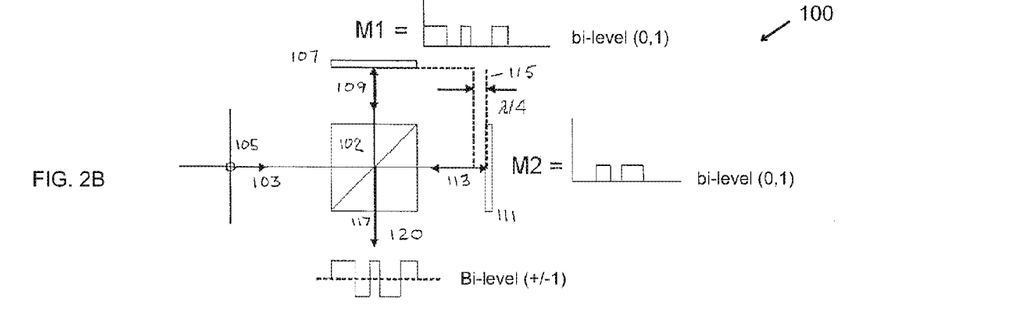
Figure 2C:
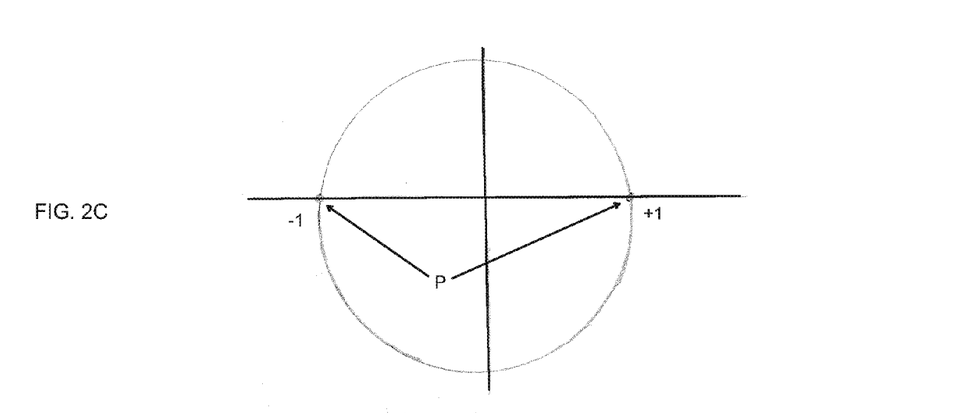

A first embodiment according to the invention illustrates the generation of square-wave functions 120 that can take on bi-level values (+1,−1) using binary mirror (digital binary MEMS) devices. FIG. 2a shows a square-wave pattern 120 that may be used to modulate an input wavefront 105 (FIG. 2b). The square-wave function can take only two values: (+1), i.e., $e^a$ corresponding to a phase of $\theta=0$ and $(-1)$, i.e., $e^{i\theta}$ corresponding to a phase of $\theta=\pi$ radians. FIG. 2b shows a first interferometrically-based optical control component 100 for obtaining the square-wave modulation 120 of the input plane wave 105. The input wavefront 105 is split into two equal (non-complex) amplitude parts by a first component beam divider/combiner 102 that is disposed along a first component optical path 103 of the incident wavefront. The reflected split wavefront is incident on a first component digital binary MEMS device $M1_1$. $M1_1$ comprises a mirror array 107 denoted by $(n_{x,y} \times m_{x,y})_{M1}$. The $M1_1$ optical path 109 from the beam splitter surface to $M1_1$ and back to the beam splitter surface (i.e., double pass) has an optical path length $L1_1$. The transmitted split wavefront is incident on a first component digital binary MEMS device $M2_1$. $M2_1$ comprises a mirror array 111 denoted by $(n_{x,y} \times m_{x,y})_{M2}$. In an exemplary aspect, n=m. The $M2_1$ optical path 113 from the beam splitter surface to $M2_1$ and back to the beam splitter surface has an optical path length $L2_1$. Phase retarder means 115, in the form of a phase plate, differential optical path length or other known phase altering component or technique for producing a differential optical path $\Delta L1L2$ equal to $\lambda/2$ ($\lambda/4$ per pass) is also shown. In the MEMS array $M1_1$, a sub array $X \times Y$ ($<n \times m$) of mirrors corresponding to a (+1) value ($\theta=0$) of the square-wave are ON, whereas in the MEMS array $M2_1$, a complementary sub array of mirrors $X \times Y$ corresponding to a $(-1)$ value ($\theta=\pi$) of the square wave are ON. In an exemplary aspect, X=Y. A phase difference of $\pi$ radians between the two reflected wavefront components is introduced using an extra optical path difference $\Delta L1L2$ equal to $\lambda/2$ in the $M2_1$ optical path, which is achieved as shown in FIG. 2b by translating $M2_1$ by $\lambda/4$ relative to $M1_1$. However, in order to generate either cosine or sine functions as discussed above, one must be able to represent grey-scale values in terms of two levels: (+1) and (-1). This can be achieved by averaging over the sub arrays of the two levels (+1) and (-1) using a half-toning technique as described below.

Half-toning algorithms are widely used in printing devices where it is required to represent grey-scale pictures using only two levels; i.e., a black dot or a blank white space. According to the embodiment, a single grey-scale pixel in a half-toned picture consists of a dot pattern over an exemplary block ($X \times Y$) of $3 \times 3$ or $5 \times 5$ mirrors. The grey-scale is achieved using spatial averaging over this block. Both the filling-in of the outputs of the binary mirror (0,1) and the grey-levels are accomplished simply by light propagation. The diffraction spreading distance $\lambda R/w$ equal to 2w, in order to have a spreading into e.g., 9 mirror segments ($3 \times 3$) is easily computed, where $\lambda$ is the wavelength, R is the distance and w is the pixel size. For w=10 µm and $\lambda$=0.5 µm, R=400 µm. This distance is sufficiently small so that the filling-in of the wavefront is not a problem in a practical device. When a half-toned pattern is printed on a paper and viewed by an observer, the spatial averaging is performed by the human eye. The eye, however, cannot resolve the fine dot pattern, so the printed image appears to have several levels between the black dot and the white blank.

Figure 3A:
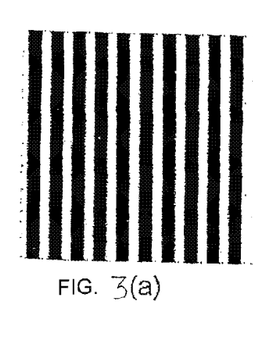
FIG. 3a illustrates a cosine function.
Figure 3B:
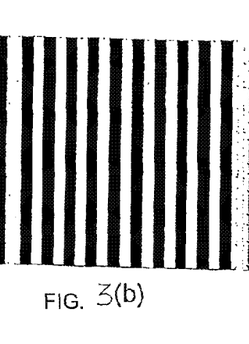
Figure 3C:
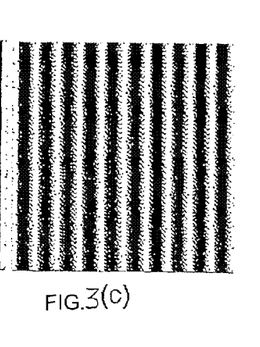
FIG. 3c shows a half-toned version of FIG. 3a obtained using the known Stucki algorithm.

FIGS. 3a-3c show alternating bar pattern illustrations of half-toning for a cosine function between two levels (+1) and (-1). The optical control component 100 in FIG. 2b functions as an interferometer for generating a wavefront with two phase levels. The component 100 MEMS arrays $M1_1$, $M2_1$ can be controlled so that the mirror sub arrays with levels (+1) and (-1) are arranged according to a selected half-toning algorithm. FIG. 3a shows a cosine function. FIG. 3b shows a hard-thresholded version of the cosine function; i.e., the non-negative pixels in FIG. 3a are assigned a value of (+1), whereas the negative pixels are assigned a value of (-1). It can be seen that the grey-scale is completely lost in this simple thresholding operation. FIG. 3c shows a half-toned version of the cosine function using the well known Stucki half-toning algorithm. The grey-scale effect is now achieved by using spatial averaging over a block of 10 pixels implying that 11 grey-levels (0-10) are achievable in a spatial-averaged sense. The white and black pixels in FIG. 3c represent values of (+1) and (-1) respectively. The half-toning concept can thus be used for generating the sine and cosine functions for an arbitrary wavefront. The inventors are not aware of the prior use of the half-toning concept in the context of wavefront generation as further described below.

Using the optical control component 100 shown in FIG. 2b, one can obtain a half-toned version of the sine or cosine functions required for wavefront generation. The (+1) and (-1) mirror sub arrays (pixels) in the half-toned pattern are turned ON in MEMS arrays $M1_1$ and $M2_1$, respectively. The value (-1) is achieved from the path difference of $\lambda/2$ in the two arms of the component. Spatial averaging over pixel blocks is achieved simply by propagating the light over a very short distance. For a given $\theta(x,y)$, it is thus possible to generate cos $[\theta(x,y)]$ and sin $[\theta(x,y)]$ by using a control component 100 as shown in FIG. 2b.

Figure 4A:
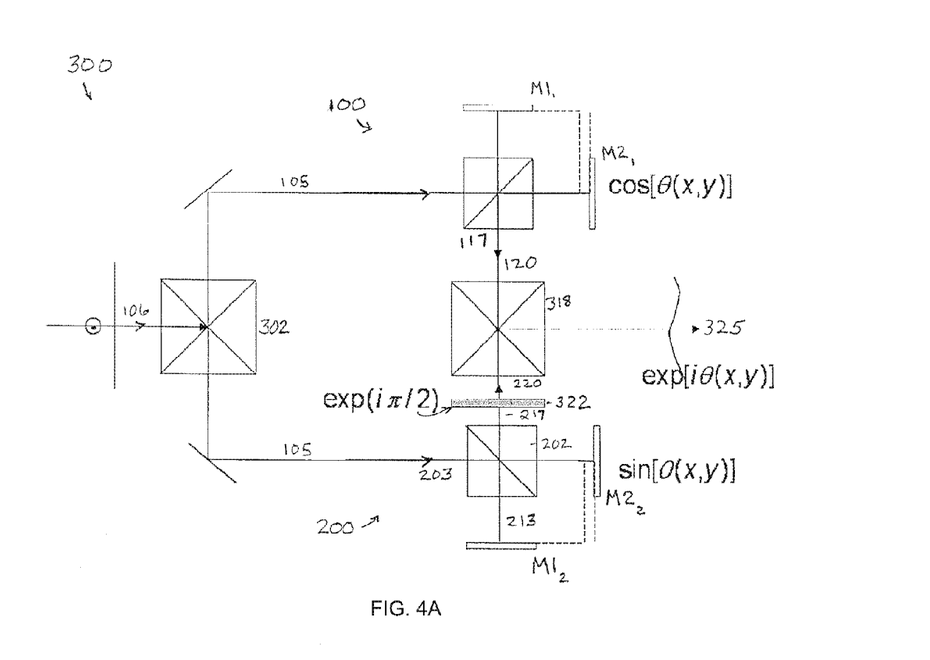
FIG. 4a shows an interferometer-based optical control device for generating an arbitrary wavefront $a(x,y)\exp[i\theta(x,y)]$ according to an embodiment of the invention.

FIG. 4a shows an interferometer-based optical control device 300. The device 300 comprises two identical components 100 (200) as shown in FIG. 2b for generating a wavefront described by $\exp[i\theta(x,y)]$. An incoming wavefront 106 is split into two output optical wavefronts 105 by an input beam divider 302 (e.g., an X-cube). The two output optical wavefronts 105 are the input optical wavefronts to the device components 100, 200. One arm of the device 300 consists of a first optical control component 100 as described above. Control component 100 provides an output 120 in the form cos $[\theta(x,y)]$. A second arm of device 300 consists of a second optical control component 200 that is essentially identical to component 100. Component 200 includes a second component beam divider/combiner 202 disposed along a second component input optical path 203 of an input optical wavefront 105. A second component digital binary MEMS device $M1_2$ comprising an $n \times m$ mirror array 207 denoted by $(n_{x,y}, m_{x,y})_{M1}$ is disposed optically downstream of the second beam divider/combiner component 202 along an $M1_2$ optical path 213 having a total optical path length $L1_2$. A second component digital binary MEMS device $M2_2$ comprising an $n \times m$ mirror array 211 denoted by $(n_{x,y}, m_{x,y})_{M2}$ is disposed optically downstream of the second beam divider/combiner component 202 along an $M2_2$ optical path 214 having a total optical path length $L2_2$ that is different than the $M1_2$ optical path 213. Phase retarder means 215 are employed to make $L1_2$ different than $L2_2$. At least some sub array ($X \times Y$) of the mirror array 207 is in an ON/OFF state and a complementary at least some similar sub array of the mirror array 211 is in an OFF/ON state. As such, component 200 functions similarly to component 100 but produces an output 220 in the form sin $[\theta(x,y)]$. An output beam combiner 318 is disposed in output optical paths 117, 217 to optically combine the respective cos $[\theta(x,y)]$ and sin $[\theta(x,y)]$ modulated outputs. Phase shifting means 322 disposed between beam splitter 202 and output beam combiner 318 provides a phase difference equal to $\pi/2$. The resultant output wavefront 325 expressed as $e^{i\theta(x,y)}$ thus has a different phase than the input optical wavefront by an amount $\theta(x,y)$.

Figures 4B, 4C:
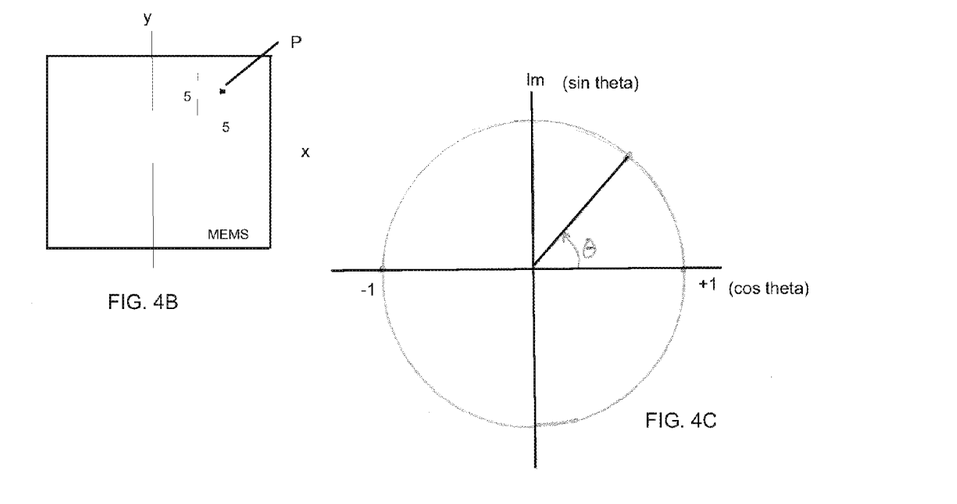

FIG. 4b illustrates a pixel P(x,y) in an exemplary $5 \times 5$ mirror sub array ($X \times Y$) of a MEMS component of FIG. 4a. At point P(x,y), the complex amplitude at point P has the form $e^{i\theta(x,y)}$ consisting of a real number (amplitude) part (cos $\theta$) and an imaginary (phase) part i(sin θ) making up the complex amplitude value. FIG. 4c is an Argand diagram representation of the complex amplitude at P(x,y) where the circumference of the circle is the locus of amplitudes and phase at position P. In the example, the real amplitude value is one.

The interferometer device 300 illustrated in FIG. 4(a) may also be used to generate a complex optical wavefront having a varying absolute value of amplitude denoted by a(x,y). More precisely, the use of half-toning concepts on the sub-assemblies 100, 200 allows one to use component 100 for the generation of a(x,y)cos θ(x,y) and, similarly, component 200 for the generation of a(x,y)sin θ(x,y), where 0≤a(x,y)≤1. An output function g(x,y) can thus be obtained by combining the two outputs as follows:

$$g(x,y) = a(x,y)\exp[i\theta(x,y)] = a(x,y)[\cos\theta(x,y) + i\sin\theta(x,y)].$$

Hence, the wavefront generation device can be used to generate an optical wavefront of arbitrary absolute value amplitude and phase.

Another embodiment of the invention is directed to a device and associated method for more advanced wavefront coding, benefiting from a simplification of hardware used in the embodiment described above through the employment of a more sophisticated algorithm. According to this embodiment, one may again generate a phase function θ(x,y), 0≤θ(x,y)≤α, for a constant angle α, using only binary (0,1) type amplitude modulation. Thus we intend to generate an output wavefront expressed as $e^{i\theta(x,y)}$. As a first step, we convert θ(x,y) to a binary picture H(x,y), which is a two-dimensional array with either zeros or ones. Therefore, we let θ(x,y)≈αH(x,y) so that $e^{i\theta(x,y)}$ can be expressed as $e^{i\alpha H(x,y)}$. The exponential can be expressed in the well-known form as:

$$e^{i\alpha H(x,y)} = 1 + i\alpha H + [(i\alpha)^2 2!]H^2 + \ldots \quad (2)$$

For H(x,y) values limited to (0,1), $H^N = H$; thus (3)

$$e^{i\alpha H(x,y)} = [1 - (\alpha^2/2!)H + (\alpha^4/4!)H - \ldots] + \quad (4)$$
$$iH[\alpha - (\alpha^3/3!) + (\alpha^5/5!) - \ldots]$$
$$= (1-H) + H[1 - (\alpha^2/2!) + (\alpha^4/4!) - \ldots] + \quad (5)$$
$$iH[\alpha - (\alpha^3/3!) + (\alpha^5/5!) - \ldots]$$
$$= (1-H) + H[\cos\alpha + i\sin\alpha] \quad (6)$$
$$= (1-H) + H\exp(i\alpha) \quad (7)$$

The novel algorithm leading to equation (7) may be realized in a two-beam interferometer device. Table II shows the values taken by the two terms in right hand side of equation (7) for the two values (0,1) taken by H.

TABLE II

|  | (1-H) | H exp(iα) |
|---|---|---|
| H = 0 | 1 | 0 |
| H = 1 | 0 | exp(iα) |

Thus if H=0, then $e^{i\alpha H}=1$ and the corresponding pixel phase is zero; and if H=1, then $e^{i\alpha H}=e^{i\alpha}$ and the corresponding pixel phase is α, where H represents a half-tone phase value obtained by turning a MEMS$_1$ sub array X×Y ON, and (1−H) represents the complement of H obtained by turning a MEMS$_2$ sub array X×Y OFF. By propagation or low-pass filtering, as is well-known to an optical engineer, one obtains an output that is an average over a block of m×m pixels. It is thus possible to obtain $m^2$ (e.g., 3×3 or 5×5) levels of phase between 0 to α.

Figure 5:
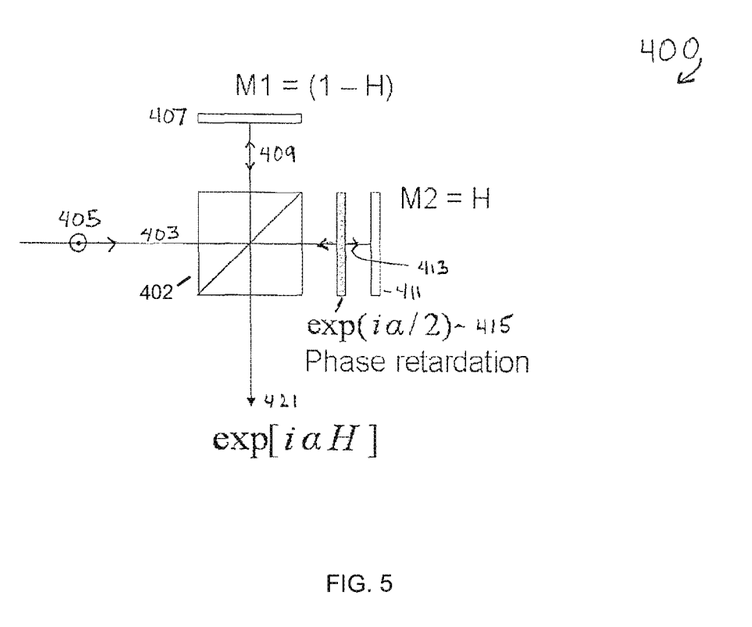
FIG. 5 shows an interferometer-based optical control device for generating a selected wavefront $\exp[i\theta(x,y)]$ according to another embodiment of the invention.

The results of the novel two-level algorithm presented above may be realized by the optical control device 400 illustrated in FIG. 5. The device 400 comprises a beam divider/combiner 402 disposed along an input optical path 403 of an incident optical wavefront 405. Incident wavefront 405 may be a plane wave expressed as $e^{i\theta(x,y)}$ or an aberrated wavefront expressed as $e^{-i\phi(x,y)}$. A first digital binary MEMS device M1 comprises an n×m mirror array $(n_{x,y}, m_{x,y})_{M1}$ 407 disposed optically downstream of the first component beam divider/combiner along an M1 optical path 409. At least some sub array $(X \times Y)_{M1}$ of the mirror array is programmed to be in an ON/OFF state that provides a half-tone phase value expressed as 1−H(x,y), wherein H(x,y) represents a two-level value equal to 0 or 1 as described above. A second digital binary MEMS device M2 has an n×m mirror array $(n_{x,y}, m_{x,y})_{M2}$ 411 disposed optically downstream of the beam divider/combiner along an M2 optical path 413. A complementary mirror sub array $(X \times Y)_{M2}$ is programmed to be in an OFF/ON state that provides a half-tone phase value expressed as H(x,y) as shown in FIG. 5. Phase retarder means 415 are provided to obtain a controlled phase difference between the M1$_{out}$ wavefront and the M2$_{out}$ wavefront of α/2. A resultant output wavefront 421 expressed as $e^{i\alpha H}$ obtained from the interference of the M1$_{out}$ wavefront (1−H) and the M2$_{out}$ wavefront (H). The wavefront 421 thus has a phase difference from the input optical wavefront 405 by an amount αH(x,y) (equal to θ(x,y)), where −π≤α≤π. If the input wave is an aberrated wavefront expressed as $e^{-i\phi(x,y)}$ as referred to above, then the output wavefront from device 400 will be expressed as $e^{i[\theta(x,y)-\phi(x,y)]}$. The device operation changes the phase between the optical input and optical output by θ(x,y) radians.

Figure 6A:
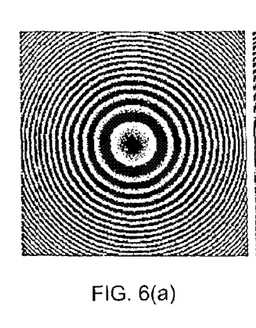
FIG. 6a illustrates a continuous quadratic phase function.
Figure 6B:
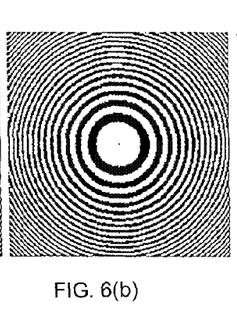
Figure 6C:
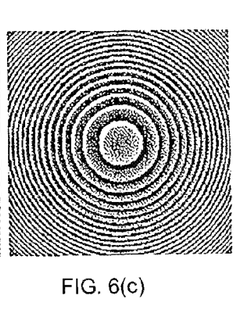
FIG. 6c shows a half-toned version of FIG. 6a obtained using the known Stucki algorithm.

An exemplary illustration is shown in FIG. 6a-6c when H is a quadratic function ($x^2 + y^2$) and the wavefront expression is $\exp[i\alpha(x^2+y^2)]$. FIG. 6a shows the profile of a continuous quadratic phase function. FIG. 6b shows the phase profile obtained by hard-thresholding of the FIG. 6a profile at a level between 0 to 2π. FIG. 6c shows the half-toned version of the FIG. 6a profile using the Stucki algorithm. In the figure, a white dot denotes phase=0; a black dot denotes phase=π radians. Grayscale effect is achieved in the half-toned FIG. 6c by means of spatial averaging.

Figure 7A:
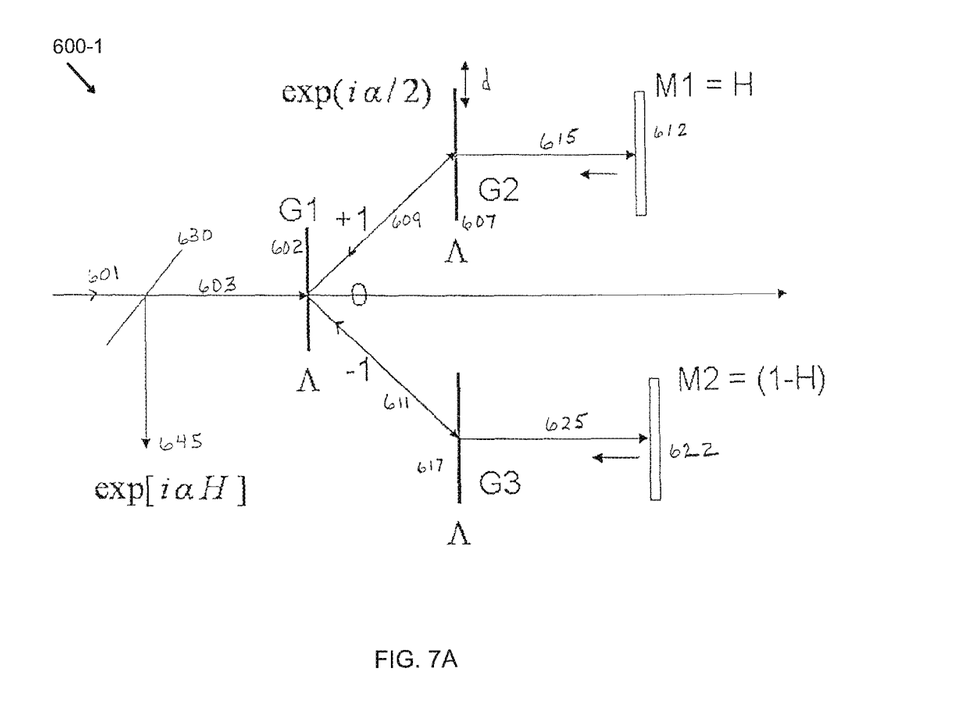
FIG. 7A shows a diffraction-interferometer-based optical control device that uses a two-level algorithm for generating a wavefront $\exp[i\theta(x,y)]$ according to another embodiment of the invention.

FIG. 7A illustrates an embodiment of a wavefront control device 600-1 that uses a two-level half-toning algorithm for controlled wavefront generation. Apart from adaptive optics applications, the inventors have recognized a need for a spatial phase modulation that is independent of wavelength. Potential applications may include various defense-based and space-borne interferometer systems. For example, one may need a phase front of θ(x,y) in the blue wavelengths (λ$_1$) and thereafter wish to generate the same phase θ(x,y) in the red portion (λ$_2$) of the spectrum. An interferometer-based optical control device 600-1 that supports this capability uses a modified form of an achromatic phase-shifting interferometer. In this regard, the disclosure of U.S. Pat. No. 4,786,124 is herein incorporated by reference in its entirety to the fullest allowable extent. Device 600-1 includes a diffractive, input wavefront divider/combiner 602 denoted by G1 disposed along an optical axis 603 of an input wavefront 601. A first component diffractive wavefront divider/combiner 607 denoted by G2 is disposed to optically intercept a positive 609 (or a negative 611) $n^{th}$-order output beam from the input wavefront divider/combiner 602. In an exemplary aspect, a first-order diffractive beam from G1 is incident on G2 (and as described below, a negative first-order diffractive beam from G1 is incident on G3). A first component digital binary MEMS device 612 denoted by M1 is disposed optically downstream of the first beam divider/combiner component along an M1 optical path 615 providing an optical path length (double pass) of L2. M1 comprises an n×m mirror array $(n_{x,y}, m_{x,y})_{M1}$ 613 (not shown). The mirror array includes a mirror sub array (X×Y<n×m) that is in a selected ON/OFF state to provide a two-level half-tone phase value H(x,y), where 0≤H≤1. According to an illustrative aspect, H(x,y) has the values (0,1). A second component diffractive wavefront divider/combiner 617 denoted by G3 is disposed to optically intercept the negative first-order output beam 611 from the input wavefront divider/combiner 602. A second component digital binary MEMS device 622 denoted by M2 is disposed optically downstream of the second beam divider/combiner component along an M2 optical path 625 providing an optical path length (double pass) of L3. M2 comprises an n×m mirror array $(n_{x,y}, m_{x,y})_{M2}$ 623 (not shown). The mirror array includes a mirror sub array (X×Y<n×m) that is in a selected complementary OFF/ON state that provides a two-level half-tone phase value (1−H(x,y)), where 0≤(1−H)≤1 (e.g., H=0,1). Optical component 630 is provided to in-couple the input wavefront 601 and out-couple the resultant output wavefront 645. In a particular aspect, G1, G2 and G3 are diffraction gratings each having a grating period Λ. G2 is displaced transversely a distances d relative to G3, where 0≤d<Λ, to provide a phase shift a/2 between the two arms of the device. For achromatic operation, L2 is equal to L3. The device 600-1 provides a resultant output wavefront 645 expressed as $e^{i\alpha H(x,y)}$ with a controlled phase αH(x,y) that is different than the input wavefront phase. The device 600-1 and operation thereof may have further potential application for phase correction in sparse-aperture telescope systems.

Figure 7B:
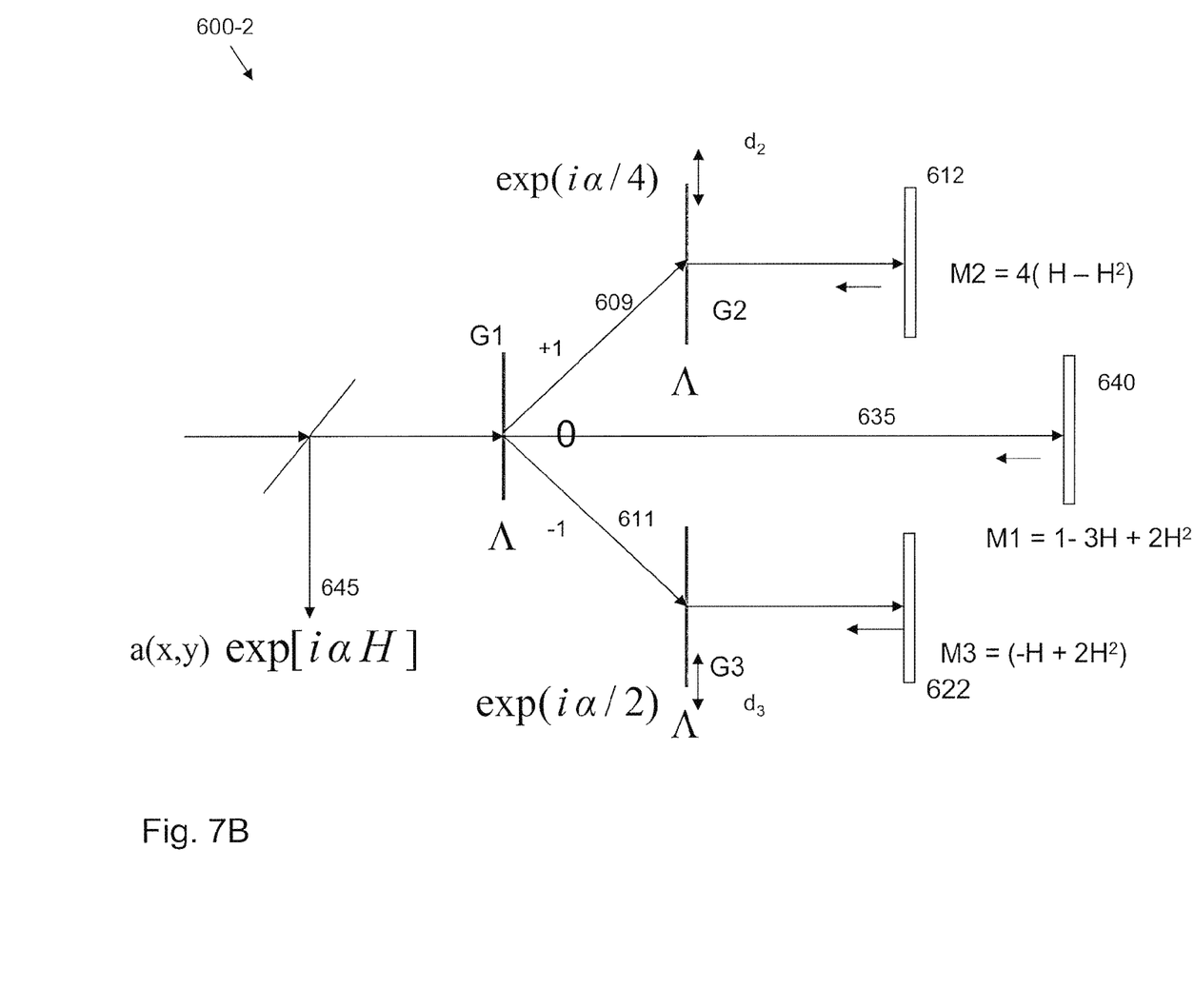
FIG. 7B shows a diffraction-interferometer-based optical control device that uses a three level algorithm for generating an arbitrary wavefront $a(x,y)\exp[i\theta(x,y)]$ according to another embodiment of the invention.

FIG. 7B illustrates another embodiment of a wavefront control device 600-2, similar to control device 600-1, that uses a three-level half-toning algorithm for controlled, arbitrary wavefront generation. The inventors recognize the need for a wavefront control device that can generate an arbitrary wavefront a(x,y) exp[iθ(x,y)]. A wavefront control device 600-2 as illustrated in FIG. 7B is based on a novel algorithm that provides a three-level interferometric binary structure derived as follows. It is possible to write identities for expressing phase in terms of amplitude modulation when more than two levels are used to obtain θ(x,y) values spanning the whole complex plane. For example, for a three-level algorithm in which each pixel in H(x,y) can take three values, e.g., (0, ½, 1), the wavefront can be represented as follow:

$$\exp[i\alpha H(x,y)] = [1-3H+2H^2] + 4[H-H^2]\exp(i\alpha/2) + [-H+2H^2]\exp(i\alpha). \quad (8)$$

It is thus possible to express phase as a sum of polynomials in H(x,y) with appropriate phase. Table III shows the values taken by the three terms on the right hand side of equation (8) for the three values (0, ½, 1) taken by H.

TABLE III

| | $1 - 3H + 2H^2$ | $4[H - H^2]\exp(i\alpha/2)$ | $[-H + H^2]\exp(i\alpha)$ |
|---|---|---|---|
| H = 0 | 1 | 0 | 0 |
| H = 1/2 | 0 | $\exp(i\alpha/2)$ | 0 |
| H = 1 | 0 | 0 | $\exp(i\alpha)$ |

This algorithm can be embodied by the grating-based interferometer device 600-2 illustrated in FIG. 7A. The device will be capable of generating an arbitrary wavefront a(x,y) exp[iθ(x,y)] using all-digital binary MEMS as disclosed herein. As shown, the input beam 601 is split by grating 602 (denoted by G1) into three beams: a zero-order beam 635 and ±$1^{st}$-order beams 609, 611. The three beams 635, 611 and 609 have respective two-way or total phase delays of 0, α/2 and α. As illustrated, the path lengths of the three beams have been made balanced or of equal length. The reflected beams from the new MEMS 640 (denoted now by M1) and MEMS 612 (M2) and 622 (M3) are combined at grating 602 (G1) and directed by the beam splitter 630 to provide an arbitrary wavefront a(x,y) exp[iθ(x,y)]. As described herein, appropriate half-toning techniques are used to generate the required absolute amplitude a(x,y).

Another embodiment of the invention directed to a polarization-based optical control device and method will now be described in relation to FIGS. 8, 9a and 9b. The current embodiment allows output wavefront phase control through polarization modulation of the incoming wavefront. An explanation of the meaning of phase difference between two beams in different states of polarization will aid in illustrating the exemplary embodiment presented below.

Figure 8:
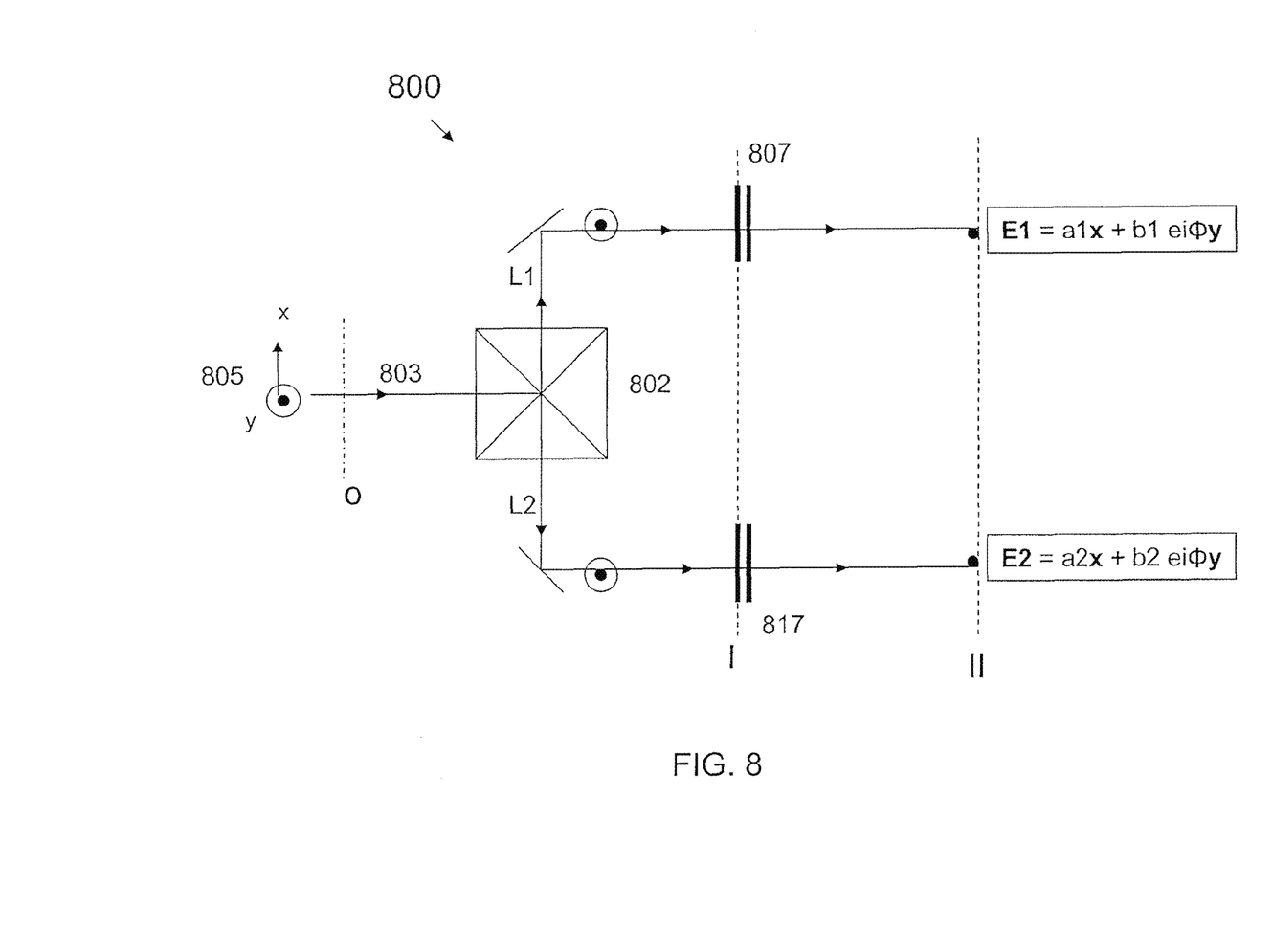
FIG. 8 is a schematic system diagram used to illustrate the concept of polarization controlled wavefront phase coding.
Figure 9A:
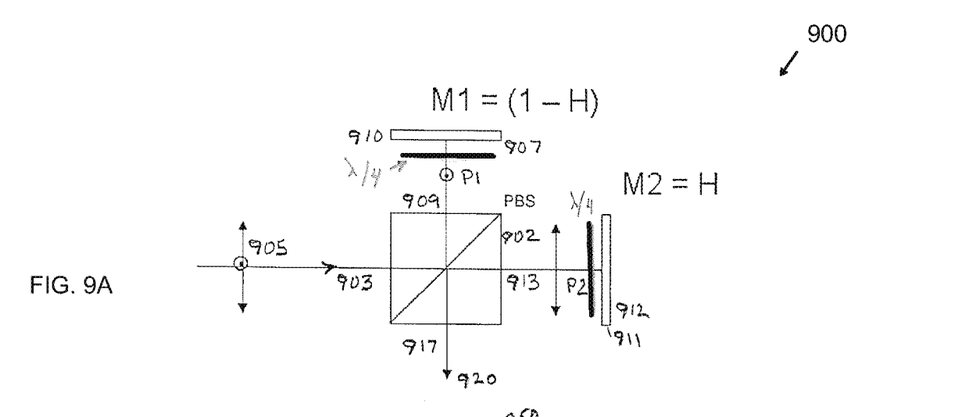
FIGS. 9a and 9b illustrate an exemplary polarization-interference-based optical control device for generating an arbitrary wavefront, and the polarization states in different pixel blocks at an output screen of the device, respectively, according to another embodiment of the invention.

With reference to the illustrative system 800 in FIG. 8, consider an incoming plane polarized beam 805 having polarization axes x, y as shown split in two parts L1, L2 by a beam-splitter 802. The two beams L1, L2 pass through respective birefringent media 807, 817 (e.g., a series of quarter or half-wave plates) having some relative orientation difference, which are located in plane I. The two beams acquire distinct states of elliptical polarization expressed as $E_1 = a_1 x + b_1 e^{i\phi_1} y$ and $E_2 = a_2 x + b_2 e^{i\phi_2} y$ at observation plane II. It can be assumed that the two beams gain the same phase due solely to their propagation. However, the two beams have a relative phase difference between them from the change in polarization state. A simple criterion for the phase difference between two beams in two different polarization states is as follows: if the two beams in distinct polarization states described by vectors $E_1$ and $E_2$ are interfered, the resultant intensity is given by:

$$I_{12} = |E_1|^2 + |E_2|^2 + 2|E_1||E_2|\cos\phi_{12} \quad (8)$$

The phase between the two polarization states is $\phi_{12}$ as seen from the cross-term. According to the instant embodiment, half-toning algorithms can be employed to generate variable polarization states across the transverse cross section of the wavefront.

An exemplary case is illustrated with reference to optical control device 900 in FIG. 9a. An incident plane wave P(x,y) 905 polarized at 45° is split into two polarization states P1, P2 by a polarizing beam splitter 902 disposed along optical axis 903. A first digital binary MEMS device 910 denoted by M1 is disposed optically downstream of the polarizing beam splitter 902 along an M1 optical path 909. M1 comprises an n×m mirror array $(n_{x,y}, m_{x,y})_{M1}$ 907 in which a mirror sub array X×Y (<n×m) is in a selected ON/OFF state that provides P1 with a half-tone phase value represented as (1−H), where 0≤(1−H)≤1. A second digital binary MEMS device 912 denoted by M2 is disposed optically downstream of the polarizing beam splitter 902 along an M2 optical path 913. M2 comprises an n×m mirror array $(n_{x,y}, m_{x,y})_{M2}$ 911, in which a complementary mirror sub array X×Y (<n×m) is in a selected complementary OFF/ON state that provides P2 with a half-tone phase value H, where 0≤H≤1. The reflected wavefronts P1, P2, each having passed twice through a quarter wave plate so as to couple efficiently through the beam combiner/divider, are optically combined by the polarizing beam splitter 902 to produce a resultant output wavefront 920 propagating along an output optical wavefront path 917.

Figure 9B:
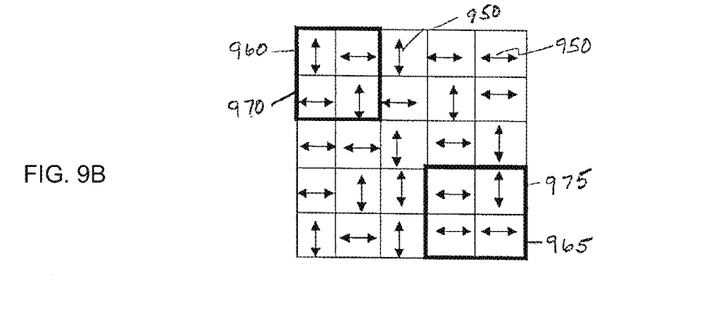

FIG. 9b illustrates the polarization states 950 in two representative individual pixel blocks 960, 965 corresponding to two illustrative 2×2 mirror sub arrays 970, 975. The two orthogonal polarization states x, y will not exhibit any interference as the corresponding cross-term in equation (7) would be zero. However, averaging over the pixel blocks 960, 965 gives rise to a gray-scale in polarization state. For example, block 960 can be characterized by $E_1=2x+2y$; block 965 can be characterized by $E_2=3x+1y$. Pixels in the averaged or low-pass filtered wavefront thus have a polarization state in between two orthogonal states used for half-toning. In FIG. 9b, the two pixel blocks can thus acquire a phase difference $\phi_{12}$ as given in equation (8), which can be used for phase correction in adaptive imaging applications. While a simple illustration of two orthogonally polarized components without any additional phase terms has been presented, a person skilled in the art will appreciate that more general realizations involving two elliptical polarization levels for half-toning are also possible. Moreover, a person skilled in the art will recognize that this embodiment, which has been described for the generation of the wavefront $\exp[i\theta(x,y)]$, may be employed to generate an arbitrary wavefront $a(x,y)\exp[i\theta(x,y)]$ by appropriate algorithmic control of the half-toning process as described above.

The embodiments described above disclose various digital binary MEMS mirror array configurations for phase front coding. The device and method embodiments have current and prospective widespread applicability to various adaptive optical systems, including, for example, those used in defense related atmospheric compensation and in laser fusion.

Figure 10:
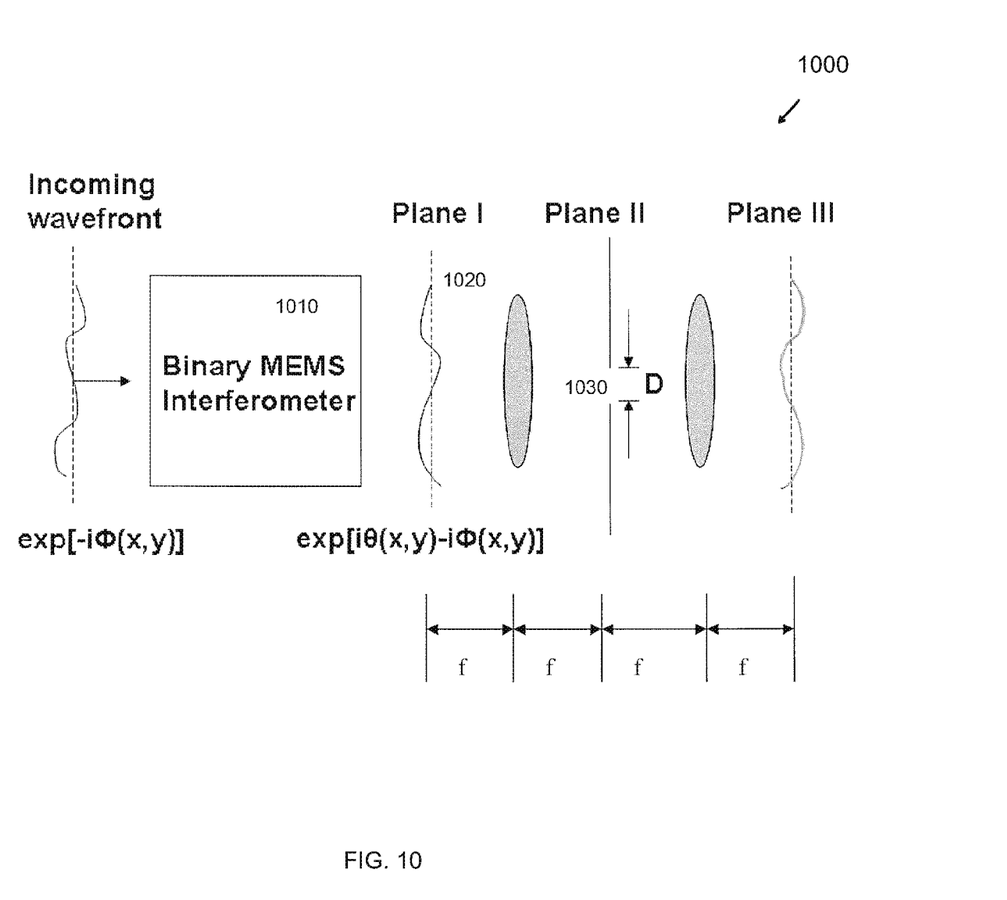
FIG. 10 schematically shows a telecentric telescope according to an aspect of the invention.

FIG. 10 depicts the use of a telecentric telescope 1000 with an illustrative digital binary MEMS device 1010 according to an embodiment of the invention. As shown in the figure, an output wavefront 1020 is generated in plane I by the device 1010. If desired, the output plane can be optically shifted downstream to plane III. This may be achieved by inserting the telecentric telescope 1000 between planes I and III as shown. The size D of the aperture 1030 in plane II controls the size (X×Y) of the mirror sub-array over which the spatial averaging is performed in order to realize the desired half-toning effects described above.

Having thus described the various embodiments of the invention, it will be apparent to those skilled in the art that the foregoing detailed disclosure is presented by way of example only and thus is not limiting. Various alterations, improvements and modifications recognized by those skilled in the art, though not expressly stated herein, may be made and are intended to be within the spirit and scope of the claimed invention. Additionally, the recited order of processing elements or sequences, or the use of numbers, letters, or other designations, is not intended to limit the claimed processes to any order except as may be specified in the claims. Accordingly, embodiments of the invention are limited only by the following claims and equivalents thereto.

REFERENCES

The subject matter disclosed in the following citations is herein incorporated by reference in their entireties to the fullest extent allowed by applicable laws and rules.

D. Dudley, W. Duncan, J. Slaughter, "Emerging digital micromirror device (DMD) applications", SPIE 4985, 14 (2003).

H. W. Babcock, "The possibility of compensating astronomical sensing", Publ. Astron. Soc. Pac. 65, 229 (1953).

F. Roddier, "Effects of atmospheric turbulence in optical astronomy", Progress in Optics, E. Wolf (Ed.), vol. 19, 281 (1981).

R. K. Tyson, Principles of Adaptive Optics, (Academic press) (1998).

M. C. Roggemann and B. M. Welsh, Imaging through the atmosphere, (CRC press) (1996).

M. C. Roggemann, B. M. Welsh, R. Q. Fugate, "Improving the resolution of ground based telescopes", Rev. Mod. Phys. 69, 437 (1997).

F. Roddier (Ed.), Adaptive optics in astronomy, (Cambridge Univ. Press), (1998).

T. Weyrauch, M. A. Vorontsov, "Atmospheric compensation with a speckle beacon in strong scintillation conditions: directed energy and laser communication applications", Appl. Opt. 44, 6388 (2005).

M. A. Vorontsov, M. Yu, "Compensation of distant phase-distorting layers" Part I & II, J. Opt. Soc. Am. A 21, 1645, 1659 (2004).

M. A. Vorontsov, E. W. Justh, L. A. Beresnev, "Adaptive optics with advanced phase-contrast techniques", Part I & II, J. Opt. Soc. Am. A 18, 1289, 1300 (2001).

Doble, N., Yoon, G. Y., Chen, L., Bierden, P., Singer, B., Olivier, S., Williams, D. R., "Use of a microelectromechanical mirror for adaptive optics in the human eye", Optics Letters 27, 1537 (2002).

Roorda, A. Williams, D. R. (2000) "Adaptive Optics and Retinal Imaging", OSA Trends in Optics and Photonics Vol. 35, Vision Science and its Applications, Vasudevan Lakshminarayanan, Ed. (Optical Society of America, Washington, D.C.) 151-162.

D. T. Gavel, E. L. Gates, C. E. Max, S. S. Oliver, B. Bauman, D. Pennington, B. Macintosh, J. Patience, C. Brown, P. Danforth, R. Hurd, S. Severson, J. Lloyd, "Recent science and engineering results with the laser guide star adaptive optics system at Lick observatory", Proc. SPIE 4839, 354 (2003).

Laboratory for Laser Energetics, Annual Report 2005, DOE/SF/19460-646,

Inertial Fusion Program and National Laser Users' Facility Program, January 2006.

C. E. Max, Adaptive Optics course material, <www.u-colick.org/~max/298C>

E. N. Ribak, "Deformable mirrors", in Adaptive Optics for Astronomy, D. Alloin and J. M. Mariotti, (Ed.), Kluwer, Boston (1994).

T. Bifano, R. K. Mali, J. Dorton, J. Perreault, N. Vandelli, M. Horenstein, D. Castanon, "Continuous membrane surface micromachined silicon deformable mirrors", Opt. Engg. 36, 1354 (1997).

W. D. Cowan, M. K. Lee, B. M. Welsh, V. M. Bright, M. C. Roggemann, "Surface micromachined segmented mirrors for adaptive optics", IEEE Journal of Selected Topics in Quantum Electronics 5, 90 (1999).

Weyrauch, T., Vorontsov, M. A., Bifano, T. G., Giles, M. K., "Adaptive Optics Systems with Micromachined Mirror Array and Stochastic Gradient Descent Controller". Proc. SPIE 4124, High-Resolution Wavefront Control: Methods, Devices, and Applications., August 2000.

J. A. Perreault, T. G. Bifano, B. M. Levine, M. N. Horenstein, "Adaptive optic correction using micromechanical deformable mirrors", Opt. Eng. 41, 561 (2002).

R. Ulichney, Digital Halftoning, MIT Press (1988).

N. George and T. Stone, Opt. Comm. 67, 185 (1988).

N. George and S. Radic, "Photomixing of achromatically frequency-modulated incoherent light", Opt. Lett. 18, 1038 (1993).

S. Pancharatnam, "Generalized theory of interference and its applications", Proc. Indian Acad. Sci. A44, 261 (1956).

R. Bhandari, "Polarization of light and topological phases", Phys. Rep. 182, 1 (1997).

Z. Bomzon, G. Biener, V. Kleiner, E. Hasman, "Space-variant Pancharatnam-Berry phase elements with computer generated sub-wavelength gratings", Opt. Lett. 27, 1141 (2002).

F. S. Roux, "Geometric phase lens", J. Opt. Soc. Am. A 23, 476 (2006).

K. Khare and N. George, "Direct coarse-sampling of electronic holograms", Opt. Lett. 28, 1004 (2003).

K. Khare and N. George, "Sampling theory approach to prolate spheroidal wave functions", J. Phys. A: Math. & General 36, 10011 (2003).

K. Khare and N. George, "Fractional finite Fourier transform", J. Opt. Soc. Am.: A 21, 1179 (2004).

K. Khare and N. George, "Sampling theory approach to eigenwavefronts of imaging systems", J. Opt. Soc. Am.: A 22, 434 (2005).

K. Khare, "Bandpass sampling and bandpass analogues of prolate spheroidal functions", Signal Processing, (2006), (accepted in press).

K. Khare, "Sampling theorem, bandlimited integral kernels and inverse problems", to be submitted to Inverse Problems.

We claim:

1. An optical control component, comprising:
   a first component beam divider/combiner disposed along a first component input optical path of an incident optical wavefront;
   a first component binary MEMS device $M1_1$ comprising an $(n_{x,y} \times m_{x,y})_{M1}$ mirror array disposed optically downstream of the first component beam divider/combiner along an M1 optical path having a total optical path length $L1_1$;
   a first component binary MEMS device $M2_1$ comprising an $(n_{x,y} \times m_{x,y})_{M2}$ mirror array disposed optically downstream of the first component beam divider/combiner along an $M2_1$ optical path different than the $M1_1$ optical path having a total optical path length $L2_1$; and
   phase retarder means for making $L1_1$ different than $L2_1$, wherein an at least one $M1_1$ sub array $(XxY)_{M2}$ is in an ON/OFF state and a complementary an at least one $M2_1$ sub array $(XxY)_{M2}$ is in an OFF/ON state, further wherein an output wavefront propagating along a first component output optical wavefront path has a controlled modulation.

2. The component of claim 1, wherein $L1_1$ is different than $L2_1$ by an amount $\Delta_1 L1L2$, where $0 < \Delta_1 L1L2 \leq (2n+1)\lambda/2$, where n=0, 1, 3, ..., so as to provide a phase shift $\leq \pi$ radians.

3. The component of claim 1, wherein X=Y and n=m.

4. The component of claim 1, wherein the M1 sub array $(XxY)_{M1}$ in an ON/OFF state and the complementary M2 sub array $(XxY)_{M2}$ in the OFF/ON state are each one or more cluster arrays XxY <nxm, further wherein each cluster array XxY is characterized by at least a two level half-toning phase approximation.

* * * * *